US010423116B2

(12) United States Patent
Ishikawa

(10) Patent No.: US 10,423,116 B2
(45) Date of Patent: Sep. 24, 2019

(54) POWER SUPPLY APPARATUS AND IMAGE FORMING APPARATUS HAVING ADJUSTED LOAD POWER

(71) Applicant: CANON KABUSHIKI KAISHA, Tokyo (JP)

(72) Inventor: Junji Ishikawa, Moriya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/201,902

(22) Filed: Nov. 27, 2018

(65) Prior Publication Data

US 2019/0163114 A1 May 30, 2019

(30) Foreign Application Priority Data

Nov. 30, 2017 (JP) .................................. 2017-230998
Aug. 23, 2018 (JP) .................................. 2018-156696

(51) Int. Cl.
*G03G 15/00* (2006.01)
*H04N 1/00* (2006.01)

(52) U.S. Cl.
CPC ......... *G03G 15/80* (2013.01); *H04N 1/00076* (2013.01); *H04N 1/00082* (2013.01); *H04N 1/00888* (2013.01); *H04N 1/00978* (2013.01)

(58) Field of Classification Search
CPC ............... G03G 15/80; H04N 1/00885; H04N 1/00888; H04N 1/00899; H04N 1/00904
See application file for complete search history.

(56) References Cited

U.S. PATENT DOCUMENTS

2012/0161538 A1 6/2012 Kinoshita
2013/0038318 A1 2/2013 Inukai
(Continued)

FOREIGN PATENT DOCUMENTS

EP 2386907 A1 11/2011
JP 2003-122230 A 4/2003
(Continued)

OTHER PUBLICATIONS

Mamoru Akimoto et al.; "Load Modulation Applied to Magnetic Resonance Wireless Power Transfer Technology and Its Applications:" NTT Technical Review, vol. 11, No. 10, Oct. 2013, pp. 1-6.

*Primary Examiner* — Thomas S Giampaolo, II
(74) *Attorney, Agent, or Firm* — Canon U.S.A., Inc. IP Division

(57) ABSTRACT

A power supply apparatus including a first circuit and a second circuit insulated from the first circuit includes an adjustment unit and a detector in the first circuit, a controller in the second circuit, and first and second communication units in the first and second circuits, respectively. The adjustment unit is configured to adjust power. The controller is configured to control the adjustment unit. The detector is configured to detect a parameter. The second communication unit is configured to perform wireless communication with the first communication unit. The first communication unit is operated with power supplied to the first communication unit by a signal generated in the first communication unit due to a signal output from the controller to the second communication unit, and transmits information about a result of detection by the detector to the second communication unit. The controller controls the adjustment unit based on the information.

19 Claims, 9 Drawing Sheets

(56) References Cited

U.S. PATENT DOCUMENTS

| | | | |
|---|---|---|---|
| 2014/0093268 A1 | 4/2014 | Iwasaki | |
| 2014/0301117 A1* | 10/2014 | Hirabayashi | G03G 15/5004 |
| | | | 363/21.15 |
| 2015/0093134 A1 | 4/2015 | Itoh | |
| 2015/0139672 A1* | 5/2015 | Nakashima | G03G 15/80 |
| | | | 399/33 |
| 2016/0139548 A1* | 5/2016 | Kosaka | G03G 15/2039 |
| | | | 399/67 |
| 2016/0378052 A1* | 12/2016 | Kosaka | G03G 15/80 |
| | | | 399/88 |
| 2017/0126918 A1* | 5/2017 | Shimura | G03G 15/80 |
| 2017/0315483 A1* | 11/2017 | Yamamoto | G03G 15/2039 |

FOREIGN PATENT DOCUMENTS

| | | |
|---|---|---|
| JP | 2004-151998 A | 5/2004 |
| JP | 2013-134462 A | 7/2013 |
| JP | 2014-176198 A | 9/2014 |
| JP | 2017-083786 A | 5/2017 |

\* cited by examiner

POWER SUPPLY APPARATUS AND IMAGE FORMING APPARATUS HAVING ADJUSTED LOAD POWER

BACKGROUND OF THE INVENTION

Field of the Invention

One disclosed aspect of the embodiments relates to a power supply apparatus and an image forming apparatus that control the power supplied to a load.

Description of the Related Art

Conventionally, an apparatus operated with power supplied from a commercial power supply is known in which the voltage of the commercial power supply that is input to a primary side and the current flowing in the primary side are detected on a secondary side insulated from the primary side.

United States Patent Publication Application No. 2014/0093268 discusses an image forming apparatus in which a voltage applied to a fixing heater provided on a primary side is detected on a secondary side via a transformer. A central processing unit (CPU) controls the temperature of the fixing heater based on the detection result.

In the technique discussed in United States Patent Publication Application No. 2014/0093268, the transformer has both the function of insulating the primary and secondary sides from each other and the function of transmitting information about the voltage on the primary side to the secondary side. The lower the frequencies of the voltage and current to be transmitted are, the greater the number of turns of the transformer needs to be set, and this requires a larger transformer.

The frequencies of the voltage and current detected in United States Patent Publication Application No. 2014/0093268 are 50 Hz or 60 Hz, which are relatively low frequencies. Specifically, use of a transformer in the technique discussed in United States Patent Publication Application No. 2014/0093268 leads to an increase in size of the image forming apparatus and costs.

SUMMARY OF THE INVENTION

In view of the above-described problem, the disclosure is directed to a technique for preventing an increase in size of an apparatus while maintaining an insulated state of first and second circuits According to an aspect of the embodiments, a power supply apparatus including a first circuit connected with a predetermined power supply and a second circuit insulated from the first circuit includes an adjustment unit, a controller, a detector, a first communication unit, and a second communication unit. The adjustment unit is provided in the first circuit and is configured to adjust power supplied from the predetermined power supply to a load. The controller is provided in the second circuit and is configured to control the adjustment unit. The detector is provided in the first circuit and is configured to detect a parameter relating to the power supplied to the load. The first communication unit is provided in the first circuit and connected with the detector. The second communication unit is provided in the second circuit, connected with the controller, insulated from the first communication unit, and configured to perform wireless communication with the first communication unit. The first communication unit is operated with power supplied to the first communication unit by a signal generated in the first communication unit due to a signal output from the controller to the second communication unit. The first communication unit transmits information about a result of detection by the detector to the second communication unit, using the signal generated in the first communication unit due to the signal output from the controller to the second communication unit. The controller controls the adjustment unit based on the information transmitted to the second communication unit.

Further features of the disclosure will become apparent from the following description of exemplary embodiments (with reference to the attached drawings).

DESCRIPTION OF THE EMBODIMENTS

Various exemplary embodiments of the disclosure will be described below with reference to the drawings. It should be noted that the shapes, relative positions, etc. of components described in the exemplary embodiments are to be changed as needed depending on the configuration of an apparatus to which the disclosure is applied and various conditions, and the exemplary embodiments described below are not intended to limit the scope of the disclosure.

A first exemplary embodiment will be described below.

[Image Forming Apparatus]

Figure 1:
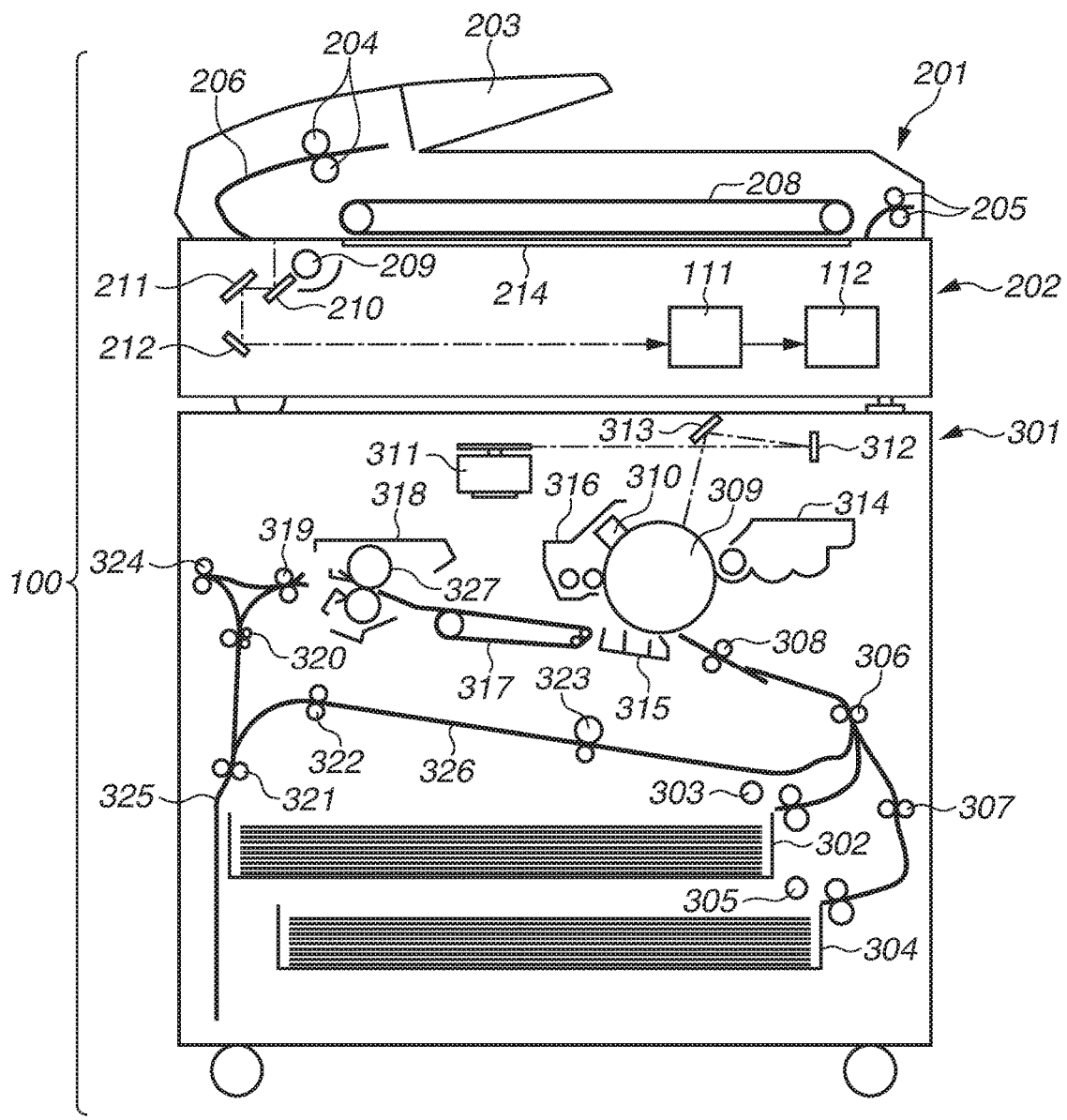
FIG. 1 is a cross sectional view illustrating an image forming apparatus according to a first exemplary embodiment.

FIG. 1 is a cross sectional view illustrating the configuration of a monochrome electrophotographic copying machine (hereinafter, "image forming apparatus") 100 with a sheet conveyance device which is used in the present exemplary embodiment. The image forming apparatus 100 is not limited to the copying machine and can be, for example, a facsimile apparatus, a printing machine, or a printer. The recording method is not limited to the electrophotographic method and can be an inkjet method, etc. The image forming apparatus 100 can be either one of a monochrome image forming apparatus and a color image forming apparatus.

The configuration and function of the image forming apparatus 100 will be described below with reference to FIG. 1. As illustrated in FIG. 1, the image forming apparatus 100 includes a document feeding device 201, a reading device 202, and an image printing device 301.

Documents stacked on a document stacking portion 203 of the document feeding device 201 are fed one by one by a sheet feeding roller 204 and conveyed along a sheet conveyance guide 206 onto a document platen glass 214 of the reading device 202. The document is conveyed at a constant speed by a sheet conveyance belt 208 and discharged onto a sheet discharge tray (not illustrated) by a sheet discharge roller 205. Reflection light from a document image illuminated by an illumination system 209 at a reading position of the reading device 202 is guided to an image reading portion 111 by an optical system including reflection mirrors 210, 211, and 212 and converted into an image signal by the image reading portion 111. The image reading portion 111 includes a lens, a charge-coupled device (CCD) which is a photoelectric conversion element, and a CCD driving circuit. The image signal output from the image reading portion 111 undergoes various correction processing performed by an image processing unit 112, which includes a hardware device such as an application-specific integrated circuit (ASIC), and the corrected image signal is output to the image printing device 301. In this way, the document reading is performed. Specifically, the document feeding device 201 and the reading device 202 function as a document reading device.

Document reading modes include first and second reading modes. The first reading mode is a mode in which an image of a document conveyed at the constant speed is read by the illumination system 209 fixed to a predetermined position and the optical system. The second reading mode is a mode in which an image of a document placed on the document platen glass 214 of the reading device 202 is read by the illumination system 209 moving at the constant speed and the optical system. In general, an image of a sheet-shaped document is read in the first reading mode, whereas an image of a bound document such as a book or booklet is read in the second reading mode.

Inside the image printing device 301 are provided sheet storage trays 302 and 304. Different types of recording mediums can be stored on the sheet storage trays 302 and 304. For example, A4-size normal sheets are stored on the sheet storage tray 302, whereas A4-size thick sheets are stored on the sheet storage tray 304. The term "recording medium" refers to a medium on which an image is to be formed by an image forming apparatus, and examples include paper sheets, resin sheets, cloth sheets, overhead projector (OHP) sheets, and labels.

The recording medium stored on the sheet storage tray 302 is fed by a sheet feeding roller 303 and forwarded to a registration roller 308 by a sheet conveyance roller 306. The recording medium stored on the sheet storage tray 304 is fed by a sheet feeding roller 305 and forwarded to the registration roller 308 by sheet conveyance rollers 307 and 306.

The image signal output from the reading device 202 is input to an optical scanning device 311 including a semiconductor laser and a polygon mirror.

The outer surface of a photosensitive drum 309 is charged by a charging device 310. After the outer surface of the photosensitive drum 309 is charged, laser light corresponding to the image signal input from the reading device 202 to the optical scanning device 311 is applied from the optical scanning device 311 through the polygon mirror and mirrors 312 and 313 to the outer surface of the photosensitive drum 309. As a result, an electrostatic latent image is formed on the outer surface of the photosensitive drum 309. The photosensitive drum 309 is charged by, for example, a charging method using a corona charging device or a charging roller.

Then, the electrostatic latent image is developed with toner stored in a development device 314 to form a toner image on the outer surface of the photosensitive drum 309. The toner image formed on the photosensitive drum 309 is transferred onto the recording medium by a transfer charging device 315 provided at a position (transfer position) facing the photosensitive drum 309. In synchronization with the transfer timing, the registration roller 308 forwards the recording medium to the transfer position.

In the manner as described above, the recording medium with the toner image transferred thereto is forwarded to a fixing device 318 by a sheet conveyance belt 317 and heated and pressed by the fixing device 318 so that the toner image is fixed to the recording medium. In this way, the image is formed on the recording medium by the image forming apparatus 100.

In the cases in which the image forming is performed in a one-sided printing mode, the recording medium having passed through the fixing device 318 is discharged onto the sheet discharge tray (not illustrated) by sheet discharge rollers 319 and 324. In the cases in which the image forming is performed in a double-sided mode, on the other hand, the fixing device 318 performs fixing processing on a first surface of the recording medium and then the recording medium is conveyed to a reverse path 325 by the sheet discharge roller 319, a sheet conveyance roller 320, and a reverse roller 321. Thereafter, the recording medium is conveyed to the registration roller 308 again by sheet conveyance rollers 322 and 323, and an image is formed on a second surface of the recording medium by the above-described method. Subsequently, the recording medium is discharged onto the sheet discharge tray (not illustrated) by the sheet discharge rollers 319 and 324.

In the case in which the recording medium with the image formed on the first surface is discharged to the outside of the image forming apparatus 100 with the surface facing downward, the recording medium having passed through the fixing device 318 is conveyed through the sheet discharge roller 319 toward the sheet conveyance roller 320. Then, the rotation of the sheet conveyance roller 320 is reversed immediately before the tail edge of the recording medium passes through a nip portion of the sheet conveyance roller 320 so that the recording medium with the first surface facing downward is discharged through the sheet discharge roller 324 to the outside of the image forming apparatus 100.

The foregoing describes the configuration and function of the image forming apparatus 100.

Figure 2:
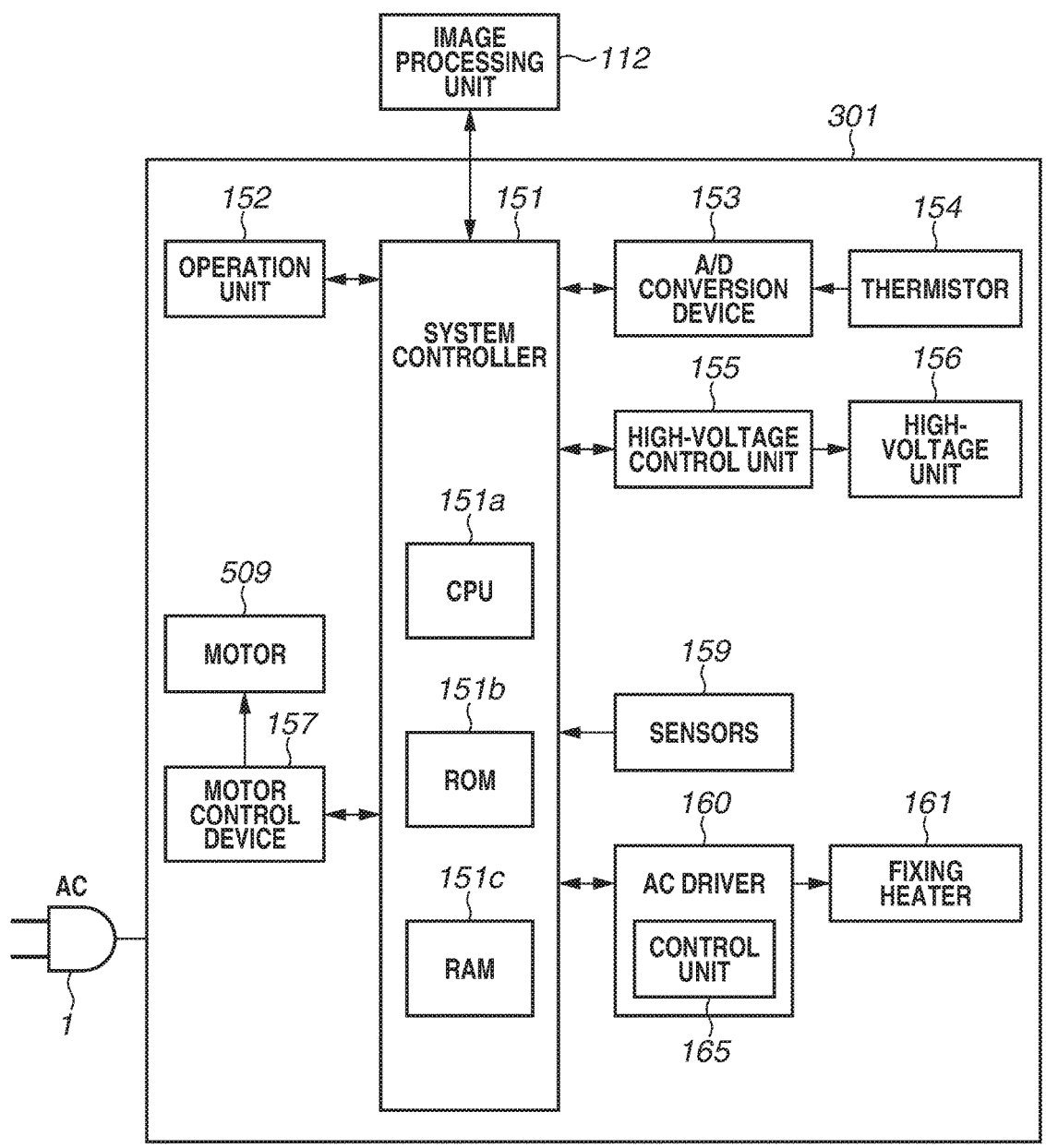
FIG. 2 is a block diagram illustrating the control configuration of the image forming apparatus according to the first exemplary embodiment.

FIG. 2 is a block diagram illustrating an example of the control configuration of the image forming apparatus 100. As illustrated in FIG. 2, the image forming apparatus 100 is connected with an alternating-current power supply 1 (AC), which is a commercial power supply, and each device in the image forming apparatus 100 is operated with power supplied from the alternating-current power supply 1. As illustrated in FIG. 2, a system controller 151 includes a CPU 151a, a read-only memory (ROM) 151b, and a random access memory (RAM) 151c. The system controller 151 is connected with the image processing unit 112, an operation unit 152, an analog/digital (A/D) conversion device 153, a high-voltage control unit 155, a motor control device 157, sensors 159, and an alternating-current (AC) driver 160. The system controller 151 is capable of transmitting and receiving data and commands to and from the connected units.

The CPU 151a reads and executes various programs stored in the ROM 151b to realize various sequences relating to predetermined image forming sequences.

The RAM 151c is a storage device. The RAM 151c stores various types of data such as setting values with respect to the high-voltage control unit 155, command values with respect to the motor control device 157, and information received from the operation unit 152.

The system controller 151 transmits, to the image processing unit 112, setting value data on the various devices provided in the image forming apparatus 100 that is needed in image processing performed by the image processing unit 112. The system controller 151 receives signals from the sensors 159 and sets the setting values of the high-voltage control unit 155 based on the received signals.

The high-voltage control unit 155 supplies a necessary voltage to a high-voltage unit 156 (the charging device 310, the development device 314, the transfer charging device 315, etc.) according to the setting values set by the system controller 151.

The motor control device 157 controls a motor configured to drive a load provided in the image forming apparatus 100 according to a command output from the CPU 151a. While only a motor 509 is illustrated as the motor of the image forming apparatus 100 in FIG. 2, the image forming apparatus 100 includes a plurality of motors. Alternatively, a single motor control device can control the plurality of motors. Further, while only a single motor control device is provided in FIG. 2, two or more motor control devices can be provided in the image forming apparatus 100.

The A/D conversion device 153 receives a detection signal detected by a thermistor 154 configured to detect the temperature of a fixing heater 161, converts the detection signal from an analog signal into a digital signal, and transmits the converted digital signal to the system controller 151. The system controller 151 controls the AC driver 160 based on the digital signal received from the A/D conversion device 153. The AC driver 160 controls the fixing heater 161 to adjust the temperature of the fixing heater 161 to a temperature required for fixing processing. The fixing heater 161 is the heater for use in fixing processing and is included in the fixing device 318.

The system controller 151 controls the operation unit 152 to display an operation screen via which a user makes the settings such as the type of a recording medium to be used (hereinafter, the type will be referred to as "sheet type"), on a display portion provided on the operation unit 152. The system controller 151 receives user-set information from the operation unit 152 and controls the operation sequences of the image forming apparatus 100 based on the user-set information. The system controller 151 transmits information indicating the state of the image forming apparatus 100 to the operation unit 152. Examples of information indicating the state of the image forming apparatus 100 include the number of sheets on which an image is to be formed, the progress status of an image forming operation, and information about sheet jams, double feeding, etc. at the document feeding device 201 and the image printing device 301. The operation unit 152 displays the information received from the system controller 151 on the display portion.

In this way as described above, the system controller 151 controls the operation sequences of the image forming apparatus 100.

[AC Driver]

Figure 3:
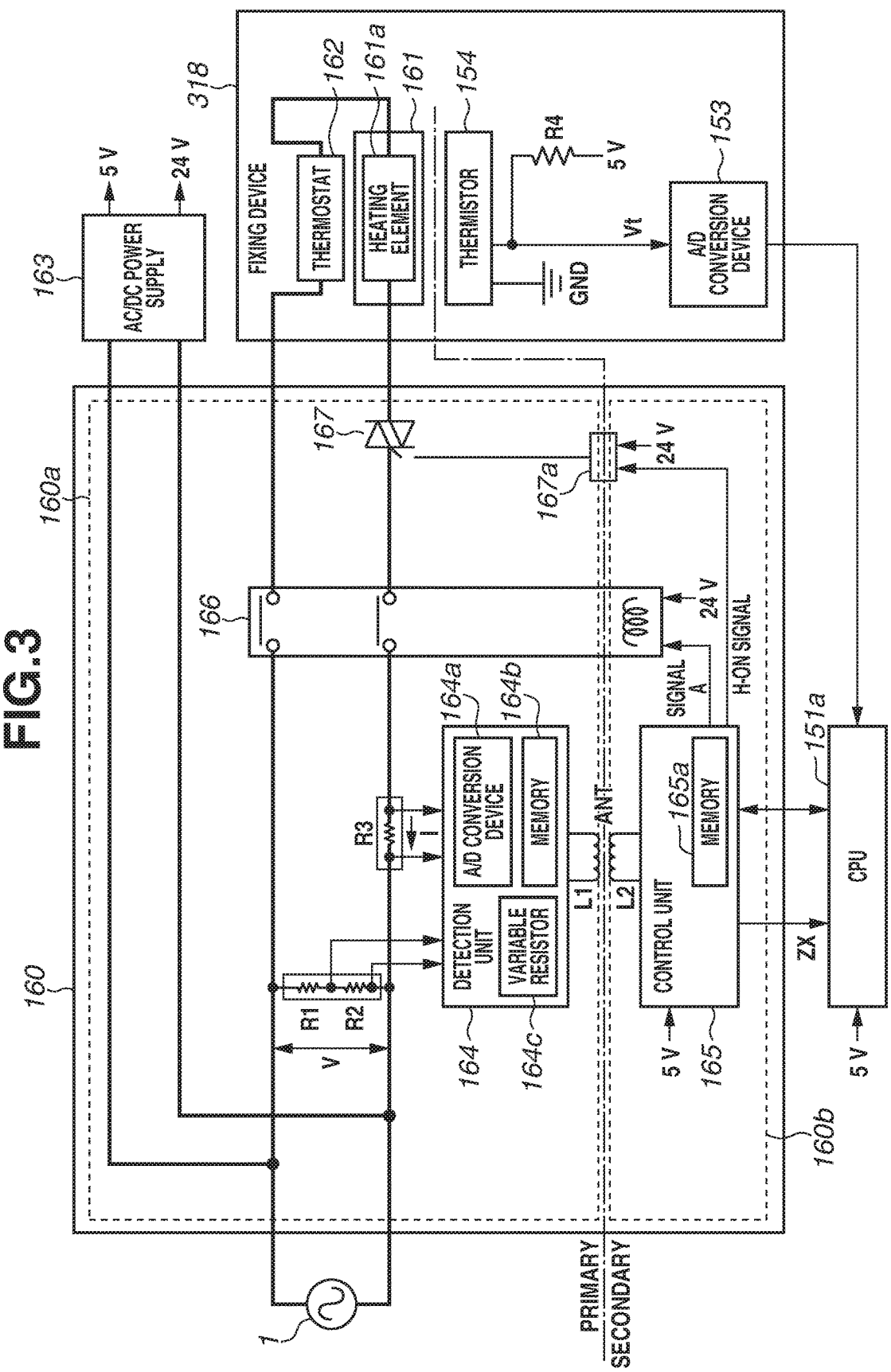
FIG. 3 is a control block diagram illustrating the configuration of an alternating-current (AC) driver according to the first exemplary embodiment.

FIG. 3 is a control block diagram illustrating the configuration of the AC driver 160. The AC driver 160 includes a first circuit 160a and a second circuit 160b. The first circuit 160a is connected with the alternating-current power supply 1, and the second circuit 160b is insulated from the first circuit 160a. As illustrated in FIG. 3, the first circuit 160a is included in a primary side of the AC driver 160, whereas the second circuit 160b is included in a secondary side of the AC driver 160.

The AC driver 160 includes a detection unit 164, a relay circuit 166, a triac 167, and a control unit 165. The detection unit 164 detects a voltage V supplied from the alternating-current power supply 1 and detects a current I flowing in the fixing heater 161. The relay circuit 166 controls the supply of power from the alternating-current power supply 1 to the fixing device 318. The control unit 165 controls the relay circuit 166 and the triac 167.

As illustrated in FIG. 3, the detection unit 164 is insulated from the control unit 165, and the detection unit 164 is provided in the first circuit 160a whereas the control unit 165 is provided in the second circuit 160b. The detection unit 164 is electromagnetically coupled with the control unit 165 by an antenna ANT. The control unit 165 is connected with the CPU 151a and controlled by the CPU 151a. The antenna ANT will be described below.

As illustrated in FIG. 3, the voltage output from the alternating-current power supply 1 is also input to an AC/direct-current (DC) power supply 163. The AC/DC power supply 163 converts the alternating-current voltage output from the alternating-current power supply 1 into, for example, DC voltages of 5 V and 24 V and outputs the DC voltages. The DC voltage of 5 V is supplied to the CPU 151a and the control unit 165. The DC voltage of 24 V is supplied to the relay circuit 166 and a triac driving circuit 167a. The DC voltages of 5 V and 24 V are also supplied to the devices in the image forming apparatus 100. The voltages output from the AC/DC power supply 163 are not supplied to the detection unit 164. The power is supplied to the detection unit 164 from the control unit 165 through the antenna ANT while the detection unit 164 remains in the insulated state. Details of the configuration will be described below.

The relay circuit 166 is controlled by a signal A output from the control unit 165. For example, if the signal A='H' is output from the control unit 165, the relay circuit 166 is changed into the state in which the alternating-current power supply 1 supplies power to the fixing device 318. On the other hand, if the signal A='L' is output from the control unit 165, the relay circuit 166 is changed into the state in which the supply of power from the alternating-current power supply 1 to the fixing device 318 is interrupted. For example, if the current flowing in the fixing heater 161 exceeds a predetermined value (i.e., if an abnormality occurs), the signal A='L' is output to the relay circuit 166. The control unit 165 outputs the signal A according to a command from the CPU 151a.

Figure 4:
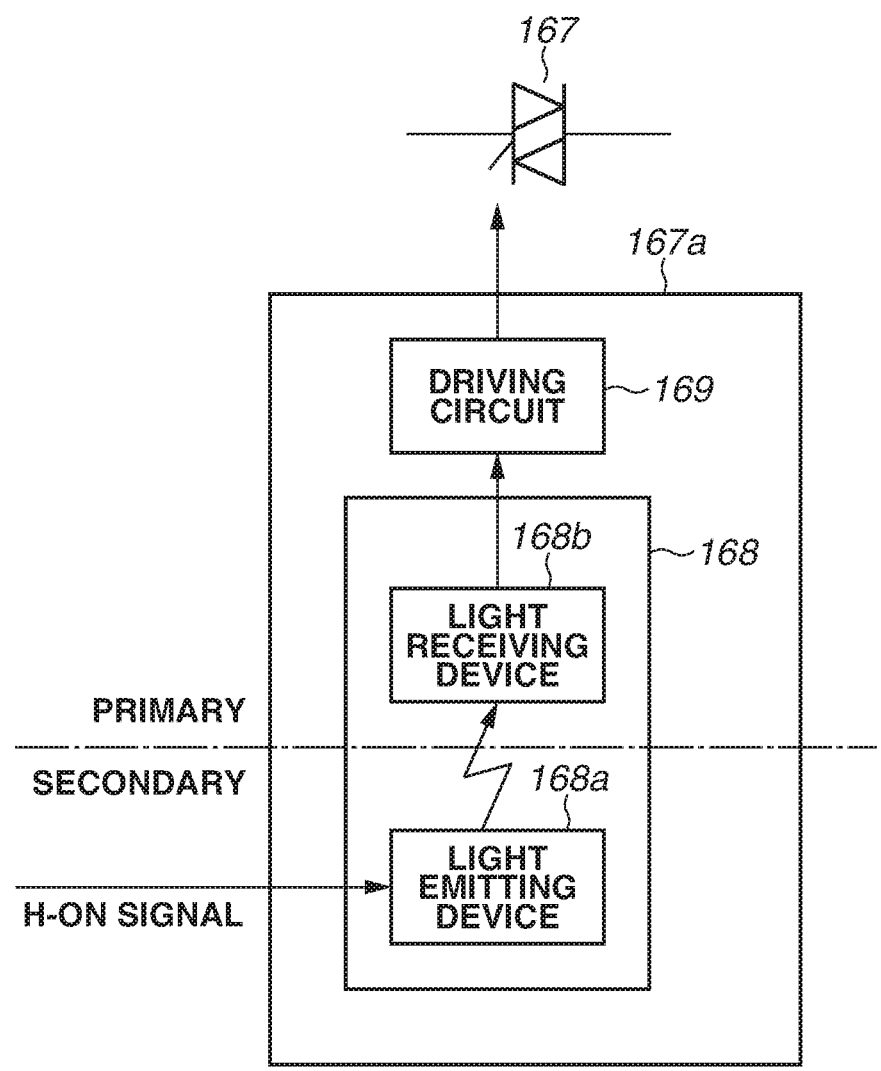
FIG. 4 is a block diagram illustrating the configuration of a triac driving circuit.

The triac driving circuit 167a is a circuit configured to control the triac 167. FIG. 4 is a block diagram illustrating the configuration of the triac driving circuit 167a. As illustrated in FIG. 4, the triac driving circuit 167a includes a photocoupler 168 and a driving circuit 169. The photocoupler 168 includes a light emitting device 168a provided in the second circuit 160b and a light receiving device 168b provided in the first circuit 160a. The driving circuit 169 drives the triac 167 according to a result of light reception by the light receiving device 168b.

If an H-ON signal='H' is output from the control unit 165, the light emitting device 168a of the triac driving circuit 167a is lit. Then, in response to the reception of the light output from the light emitting device 168a by the light receiving device 168b provided in the triac driving circuit 167a, the driving circuit 169 drives the triac 167 so that the triac 167 is turned into the on-state. In this way, the triac 167 of the first circuit 160a is controlled from the second circuit 160b side while the insulation between the first circuit 160a and the second circuit 160b is maintained.

The triac 167 is controlled as described above to supply power to the fixing heater 161. The amount of power supply to the fixing heater 161 is adjusted by controlling the timing at which the triac 167 is turned into the on-state.

<Temperature Control of Fixing Heater>

A method of controlling the temperature of the fixing heater 161 will be described below. The power output from the alternating-current power supply 1 is supplied through the AC driver 160 to a heating element 161a within the fixing heater 161 provided in the fixing device 318.

The detection unit 164 detects the voltage V (the voltage V of the respective ends of a resistor device R2) supplied from the alternating-current power supply 1. The detection unit 164 detects the current I flowing in the heating element 161a, based on the voltage V of the respective ends of the resistor device R2.

The detection unit 164 includes an A/D conversion device 164a configured to convert the input voltage V and the current I from an analog value into a digital value. The detection unit 164 samples the voltage V and the current I converted by the A/D conversion device 164a at a predetermined period T (e.g., 50 μs). The detection unit 164 performs integration of V^2, I^2, and V*I as specified by equations (1) to (3) below each time the detection unit 164 performs sampling of the voltage V and the current I.

$$\Sigma V(n)^2 \quad (1)$$

$$\Sigma I(n)^2 \quad (2)$$

$$\Sigma V(n)I(n) \quad (3)$$

The detection unit 164 stores the integrated values in a memory 164b.

The detection unit 164 detects the timings (hereinafter, "zero-cross timings") at which the voltage V is changed from a negative value to a positive value.

At the zero-cross timings, the detection unit 164 calculates a root mean square value Vrms of the voltage V, a root mean square value Irms of the current I, and a root mean square value Prms of V*I (=P) using equations (4) to (6) below.

$$Vrms = \sqrt{\frac{1}{N}\sum_{n=1}^{N} V(n)^2} \quad (4)$$

$$Irms = \sqrt{\frac{1}{N}\sum_{n=1}^{N} I(n)^2} \quad (5)$$

$$Prms = \frac{1}{N}\sum_{n=1}^{N} V(n)I(n) \quad (6)$$

The detection unit 164 stores the calculated root mean square values Vrms, Irms, and Prms in the memory 164b. Each time the detection unit 164 calculates the root mean square values Vrms, Irms, and Prms, the detection unit 164 resets the integrated values of V^2, I^2, and V*I stored in the memory 164b.

When a zero-cross timing occurs, the detection unit 164 notifies, through the antenna ANT, the control unit 165 of the root mean square values Vrms, Irms, and Prms stored in the memory 164b and the occurrence of the zero-cross timing, using the below-described method.

The control unit 165 stores the root mean square values Vrms, Irms, and Prms acquired from the detection unit 164 in a memory 165a. The control unit 165 notifies the CPU 151a of the occurrence of the zero-cross timing (signal ZX).

When the CPU 151a is notified of the occurrence of the zero-cross timing by the control unit 165, the CPU 151a acquires the root mean square values Vrms, Irms, and Prms stored in the memory 165a of the control unit 165. As described above, the CPU 151a acquires the root mean square values Vrms, Irms, and Prms each time the zero-cross timing occurs. Specifically, in the present exemplary embodiment, the signal ZX is a trigger signal that causes the CPU 151a to acquire the root mean square values Vrms, Irms, and Prms.

The fixing device 318 includes a thermostat 162. The thermostat 162 has the function of stopping the supply of power to the heating element 161a when the thermostat 162 reaches a predetermined temperature.

In the vicinity of the fixing heater 161 is provided the thermistor 154 configured to detect the temperature of the fixing heater 161. As illustrated in FIG. 3, the thermistor 154 is connected to the ground (GND). The thermistor 154 has a characteristic that, for example, the higher the temperature is, the lower the resistance value is. A change in the temperature of the thermistor 154 causes a change in a voltage Vt of the respective ends of the thermistor 154. The voltage Vt is detected to detect the temperature of the fixing heater 161.

The voltage Vt as an analog signal output from the thermistor 154 is input to the A/D conversion device 153. The A/D conversion device 153 converts the voltage Vt from the analog signal into a digital signal and outputs the converted digital signal to the CPU 151a.

The CPU 151a controls the temperature of the fixing heater 161 by controlling the triac 167 via the control unit 165 based on the root mean square values Vrms, Irms, and Prms acquired from the control unit 165 and the voltage Vt output from the A/D conversion device 153. A specific method by which the temperature of the fixing heater 161 is controlled will be described below.

Figure 5:
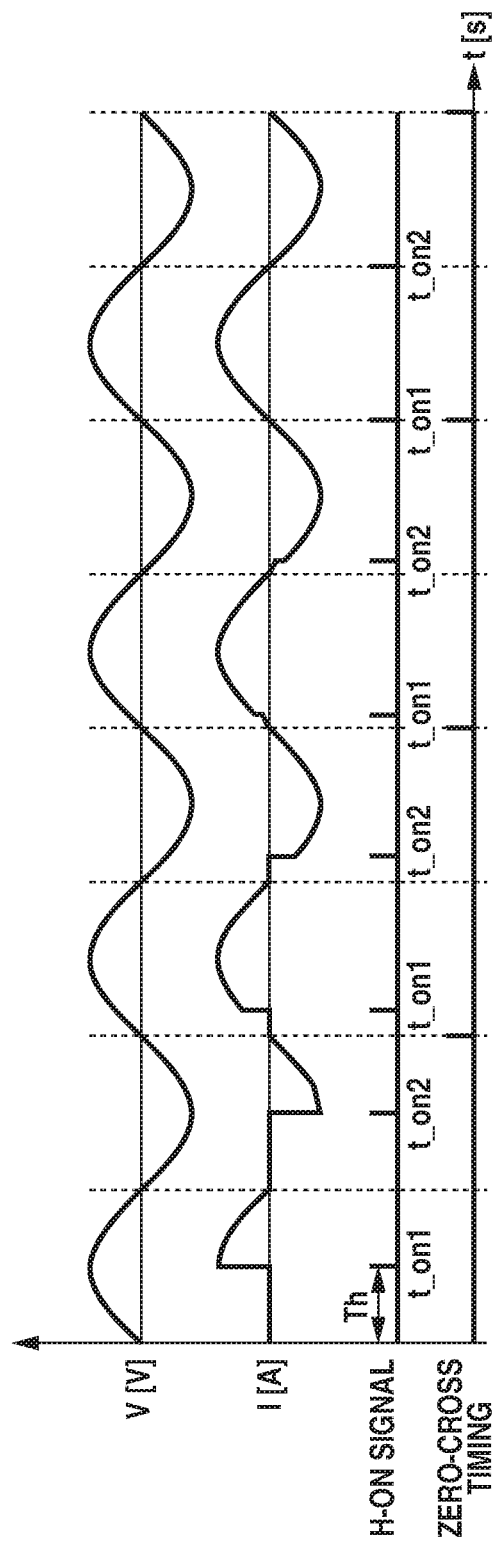
FIG. 5 is a time chart illustrating a voltage V of an alternating-current power supply, a current I flowing in a heating element, an H-ON signal output from a control unit, and zero-cross timings.

FIG. 5 is a time chart illustrating the voltage V of the alternating-current power supply 1, the current I flowing in the heating element 161a, the H-ON signal output from the control unit 165, and the zero-cross timings. As illustrated in FIG. 5, a period Tzx of the zero-cross timings corresponds to the period of the voltage V of the alternating-current power supply 1.

As illustrated in FIG. 5, by controlling a time Th from the zero-cross timing to a timing t_on1 at which the H-ON signal='H' is output, the amount of current flowing in (the amount of power supplied to) the heating element 161a is controlled. Specifically, for example, the shorter the time Th is, the greater the amount of current flowing in the heating element 161a is. Specifically, by performing the control to decrease the time Th, the temperature of the fixing heater 161 is increased.

In the present exemplary embodiment, the CPU 151a controls the amount of current flowing in the heating element 161a by controlling the time Th from the zero-cross timing to the timing t_on1 via the control unit 165. As a result, the CPU 151a is able to control the temperature of the fixing heater 161. In the present exemplary embodiment, the triac 167 is controlled such that a current of the same amount as and the opposite polarity to the current caused to flow by the output of the H-ON signal='H' at the timing t_on1 flows in the heating element 161a. Specifically, as illustrated in FIG. 5, the H-ON signal='H' is output also at a timing t_on2 (i.e., the timing after the half period of the voltage V of the alternating-current power supply 1) at which a time Tzx/2 passes from the timing t_on1.

Figure 6:
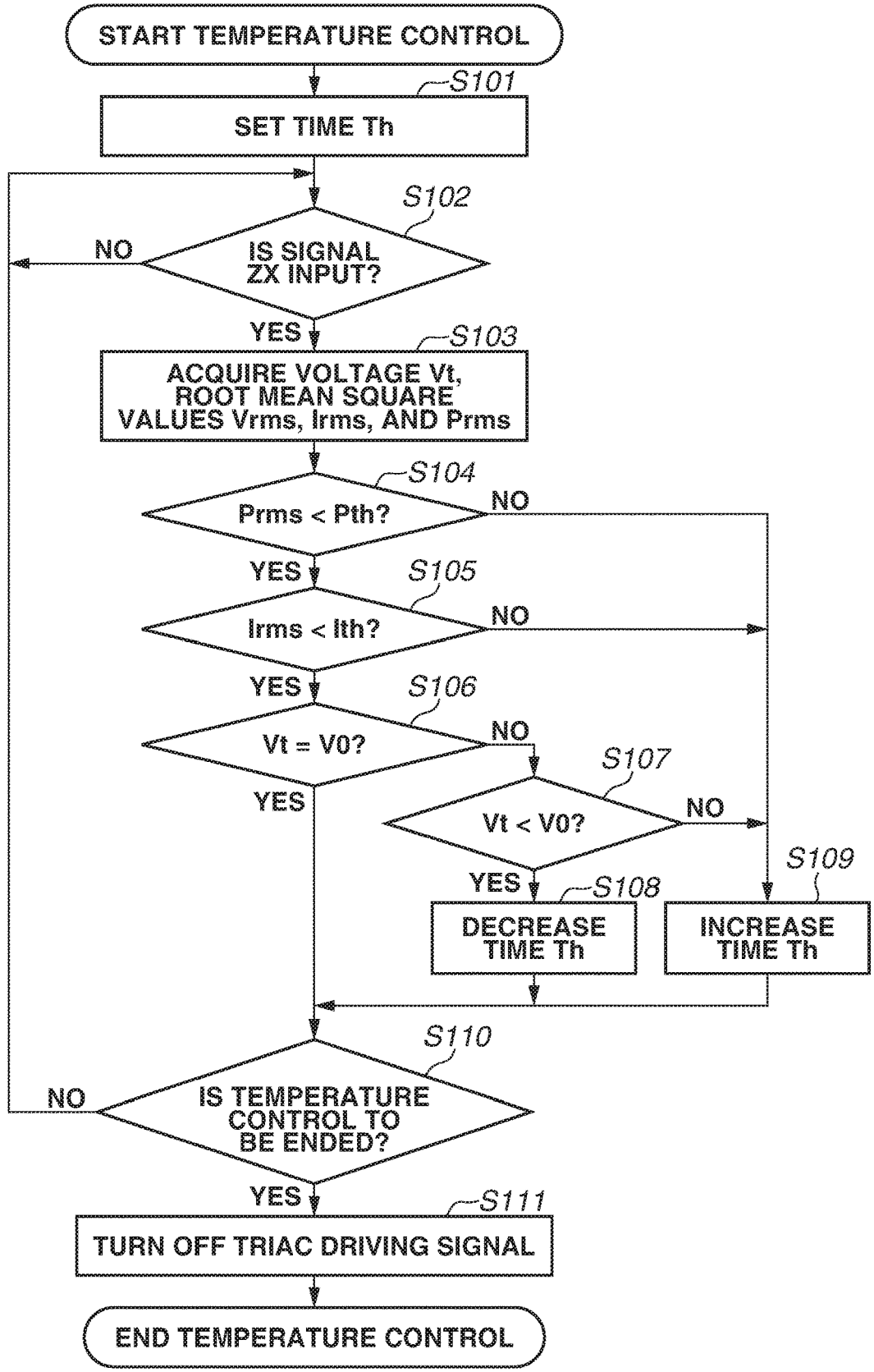
FIG. 6 is a flowchart illustrating a method of controlling the temperature of a fixing heater according to the first exemplary embodiment.

FIG. 6 is a flowchart illustrating the method of controlling the temperature of the fixing heater 161. The temperature control of the fixing heater 161 in the present exemplary embodiment will be described below with reference to FIG. 6. The process illustrated in the flowchart is executed by the CPU 151a. The process illustrated in the flowchart is executed when, for example, the image forming apparatus 100 is activated.

In step S101, the CPU 151a sets the time Th based on, for example, the difference value between the voltage Vt acquired from the A/D conversion device 153 and a voltage V0 corresponding to a target temperature of the fixing heater 161, and notifies the control unit 165 of the set time Th. As a result, the control unit 165 outputs the H-ON signal based on the set time Th to the triac driving circuit 167a.

Thereafter, in step S102, if the signal ZX is input from the control unit 165 to the CPU 151a (YES in step S102), then in step S103, the CPU 151a acquires the voltage Vt output from the A/D conversion device 153 and the root mean square values Vrms, Irms, and Prms stored in the memory 165a of the control unit 165.

Thereafter, in step S104, if the root mean square value Prms of the power is greater than or equal to a threshold value Pth (Prms≥Pth) (NO in step S104), then in step S109, the CPU 151a outputs an instruction to increase the currently-set time Th to the control unit 165. An amount by which the time Th is increased can be a predetermined value or can be determined based on the difference value between the root mean square value Prms and the threshold value Pth.

As described above, the time Th is set such that the root mean square value Prms is decreased to a value less than the threshold value Pth if the root mean square value Prms of the power is greater than or equal to the threshold value Pth, whereby excessive power supply to the fixing heater 161 is prevented. As a result, an increase in power consumption can be prevented. The threshold value Pth is set to a greater value than the power by which the temperature of the fixing heater 161 is increased to the target temperature.

Thereafter, the processing proceeds to step S110.

On the other hand, in step S104, if the root mean square value Prms of the power is less than the threshold value Pth (Prms<Pth) (YES in step S104), the processing proceeds to step S105.

In step S105, if the root mean square value Irms of the current is greater than or equal to a threshold value Ith (Irms≥Ith) (NO in step S105), then in step S109, the CPU 151a outputs an instruction to increase the currently-set time Th to the control unit 165. An amount by which the time Th is increased can be a predetermined value or can be determined based on the difference value between the root mean square value Irms and the threshold value Ith.

As described above, the time Th is controlled such that the root mean square value Irms is decreased to a value less than the threshold value Ith if the root mean square value Irms is greater than or equal to the threshold value Ith, whereby excessive power supply to the heating element 161a is prevented. As a result, the temperature of the fixing heater 161 can be prevented from excessively increasing. The threshold value Ith is set to a greater value than the current by which the temperature of the fixing heater 161 is increased to the target temperature.

Thereafter, the processing proceeds to step S110.

On the other hand, in step S105, if the root mean square value Irms is less than the threshold value Ith (Irms<Ith) (YES in step S105), the processing proceeds to step S106.

In step S106, if the voltage Vt acquired from the A/D conversion device 153 is equal to the voltage V0 corresponding to the target temperature of the fixing heater 161 (YES in step S106), the processing proceeds to step S110.

On the other hand, in step S106, if the voltage Vt acquired from the A/D conversion device 153 is not equal to the voltage V0 corresponding to the target temperature of the fixing heater 161 (NO in step S106), the processing proceeds to step S107.

In step S107, if the voltage Vt is higher than the voltage V0 (NO in step S109), then in step S109, the CPU 151a outputs an instruction to increase the currently-set time Th to reduce the deviation of the voltage Vt from the voltage V0, to the control unit 165. An amount by which the time Th is increased can be a predetermined value or can be determined based on the difference value between the voltages V0 and Vt.

On the other hand, in step S107, if the voltage Vt is lower than the voltage V0 (YES in step S107), then in step S108, the CPU 151a outputs an instruction to decrease the currently-set time Th to reduce the deviation of the voltage Vt from the voltage V0, to the control unit 165. An amount by which the time Th is increased can be a predetermined value or can be determined based on the difference value between the voltages V0 and Vt.

In step S110, if the temperature control is to be continued (i.e., if the print job is to be continued) (NO in step S110), the processing returns to step S102.

On the other hand, in step S110, if the temperature control is to be ended (i.e., if the print job is to be ended) (YES in step S110), then in step S111, the CPU 151a controls the control unit 165 to stop the driving of the triac 167.

For example, the amount of change in power that is caused by the increase of the time Th differs between, for example, the case in which the root mean square value Vrms of the voltage is 100 V and the case in which the root mean square value Vrms of the voltage is 80 V. Specifically, the amount of change in power that is caused by the increase of the time Th in the case in which the root mean square value Vrms of the voltage is 100 V is greater than the amount of change in power that is caused by the increase of the time Th in the case in which the root mean square value Vrms of the voltage is 80 V. The CPU 151a controls the time Th based on the root mean square value Vrms of the voltage V. The foregoing describes the method of controlling the temperature of the fixing heater 161.

<Antenna ANT>
{Power Supply from Control Unit to Detection Unit}

The detection unit 164 provided in the first circuit 160a is insulated from the control unit 165 provided in the second circuit 160b and is electromagnetically coupled with the control unit 165 through the antenna ANT including a coil (winding) L1 as a first communication unit and a coil (winding) L2 as a second communication unit. To the coil L2, an amplitude-modulated high-frequency (e.g., 13.56 MHz) signal is output. An alternating current corresponding to the signal flows in the coil L2, and an alternating magnetic field generated in the coil L2 by the flow of the alternating current generates an alternating-current voltage in the coil L1. The detection unit 164 is operated by the alternating-current voltage generated in the coil L1. As described above, in the present exemplary embodiment, the power is supplied from the control unit 165 to the detection unit 164 through the antenna ANT. As a result, the first circuit 160a does not need to include a power supply for operating the detection unit 164, and thus, an increase in apparatus size and costs can be prevented. The control unit 165 supplies power to the detection unit 164 at, for example, a shorter period than the period at which the detection unit 164 detects the voltage V and the current I. The control unit 165 does not need to supply power to the detection unit 164 while the image forming apparatus 100 is in the sleep state.

{Data Communication Between Control Unit and Detection Unit}

Figure 7:
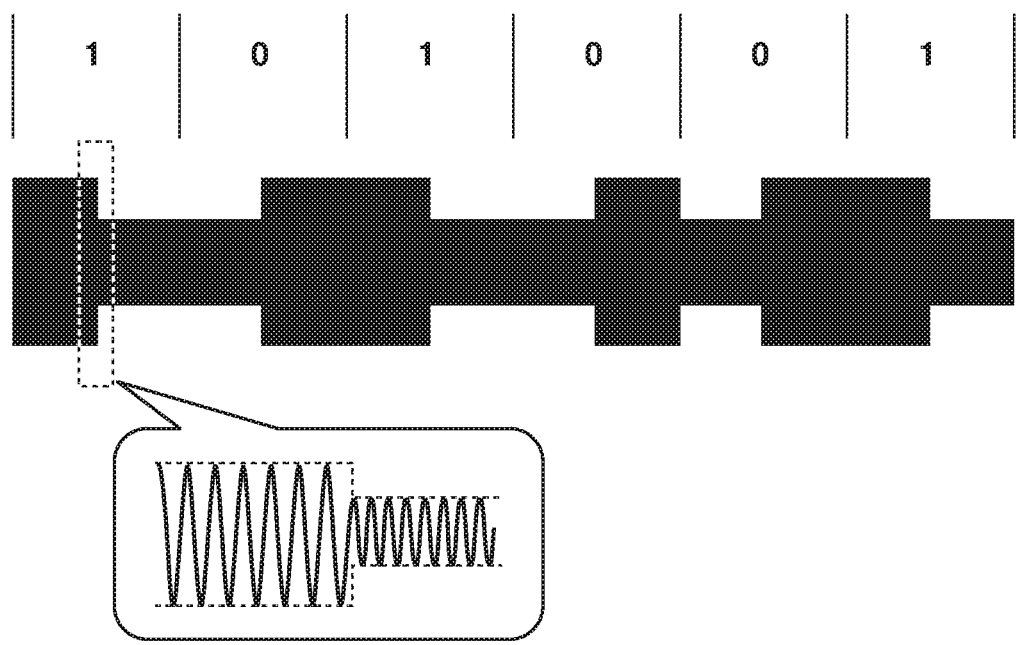
FIG. 7 illustrates an amplitude-modulated modulation wave.

FIG. 7 illustrates the amplitude-modulated signal. As illustrated in FIG. 7, signals representing '0' and '1' are represented by a combination of a signal having a first amplitude and a signal having a second amplitude which is less than the first amplitude. For example, the signal representing '1' is represented by a signal in which the first half of one bit has the first amplitude and the last half of the bit has the second amplitude. On the other hand, the signal representing '0' is represented by a signal in which the first half of one bit has the second amplitude and the last half of the bit has the first amplitude.

The amplitude-modulated signal as illustrated in FIG. 7 is output to the coil L2. As a result, a signal corresponding to the signal output to the coil L2 is generated in the coil L1.

The detection unit 164 changes, for example, the resistance value of a variable resistor 164c provided in the detection unit 164 according to data to be transmitted to the control unit 165. As a result, the impedance of the coil L1 is changed to change the signal generated in the coil L1, and the data is transmitted to the control unit 165. The detection unit 164 superimposes the data on the signal generated in the coil L1 as described above to transmit the data to the control unit 165. The data corresponds to the root mean square values Vrms, Irms, and Prms, the signal ZX indicating the zero-cross timing, etc.

The control unit 165 extracts the data from the signal generated in the coil L2 due to the superimposition of the data on the signal generated in the coil L by the detection unit 164. Specifically, the control unit 165 reads the data from the detection unit 164 by detecting a change in the signal generated in the coil L2 due to the changing of the impedance of the coil L in the superimposition of the data on the signal generated in the coil L1 by the detection unit 164.

In this way, the detection unit 164 transmits the data to the control unit 165 which is electromagnetically coupled by the antenna ANT. Specifically, the detection unit 164 transmits the data to the control unit 165 through wireless communication between the coils L1 and L2.

As described above, in the present exemplary embodiment, the detection unit 164 provided in the first circuit 160a is insulated from the control unit 165 provided in the second circuit 160b and is electromagnetically coupled with the control unit 165 by the antenna ANT including the coils L1 and L2. Specifically, an alternating-current voltage is generated in the coil L1 by an alternating-current magnetic field generated in the coil L2 due to the alternating current flowing in the coil L2 in response to the signal output from the control unit 165. The detection unit 164 is operated by the alternating-current voltage generated in the coil L1. As described above, in the present exemplary embodiment, the power is supplied from the control unit 165 through the antenna ANT to the detection unit 164. As a result, the first circuit 160a does not need to include a power supply for operating the detection unit 164, and thus, an increase in apparatus size and costs can be prevented while the insulated state between the first circuit 160a and the second circuit 160b is maintained.

In the present exemplary embodiment, the detection unit 164 transmits the data to the control unit 165 by, for example, changing the impedance of the coil L1 to change the signal generated in the coil L1. The control unit 165 reads the data from the detection unit 164 by detecting the change. In this way, the detection unit 164 transmits the data to the control unit 165 which is electromagnetically coupled by the antenna ANT. As a result, it is unnecessary to provide a transformer between the first circuit 160a and the second circuit 160b, and thus, an increase in apparatus size and costs can be prevented while the insulated state between the first circuit 160a and the second circuit 160b is maintained.

A second exemplary embodiment will be described below. Description of the components of the image forming apparatus 100 that are similar to those in the first exemplary embodiment is omitted.

Figure 8:
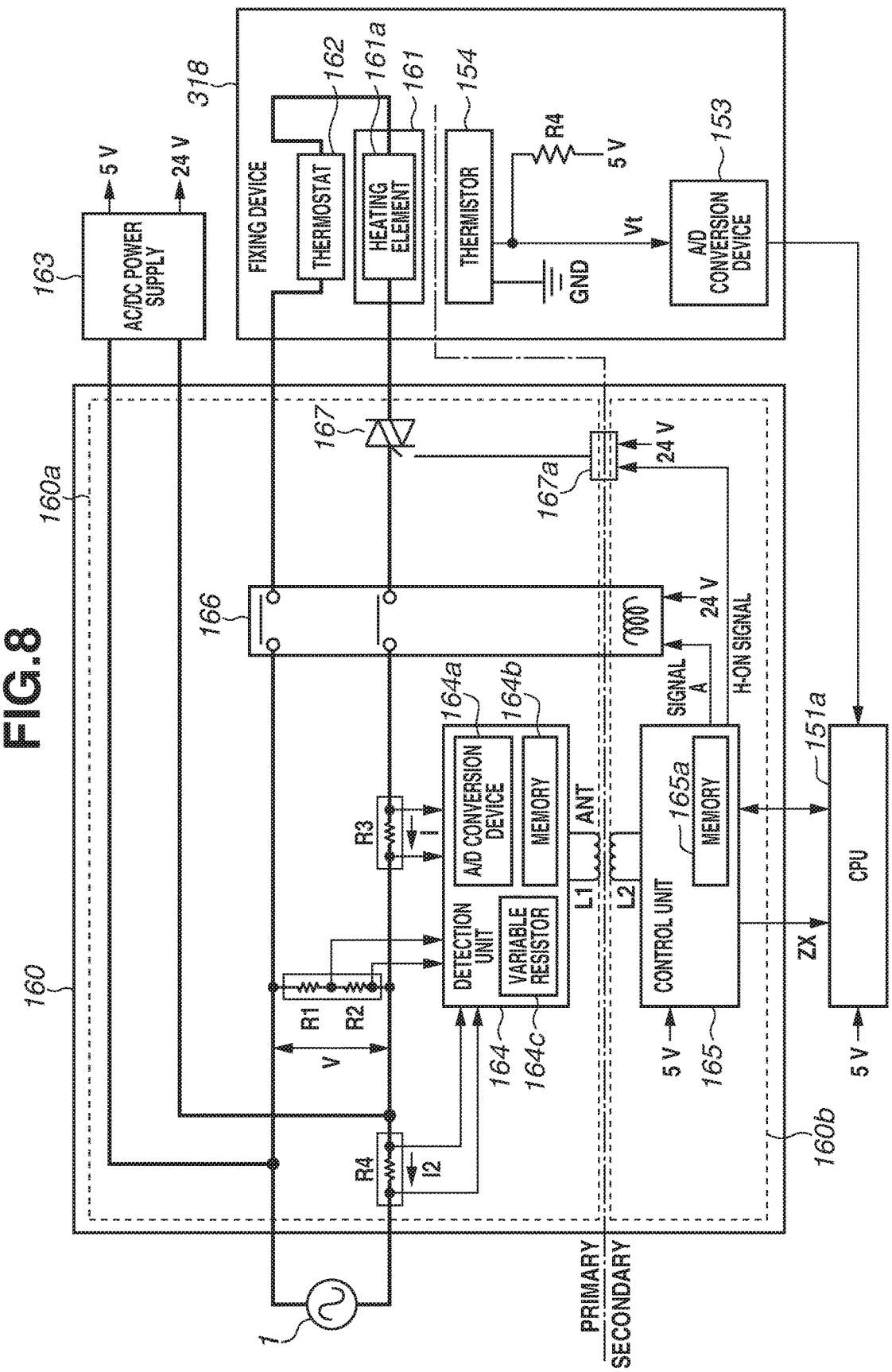
FIG. 8 is a control block diagram illustrating the configuration of the AC driver according to a second exemplary embodiment.

FIG. 8 is a block diagram illustrating the configuration of the AC driver 160 in the present exemplary embodiment. As illustrated in FIG. 8, a resistor device R4 is provided in the first circuit 160a in the AC driver 160 according to the present exemplary embodiment. The resistor device R4 is a resistor device configured to detect a current I2 having the total amount of current flowing in the first circuit 160a.

The detection unit 164 calculates a root mean square value I2rms based on the result of detection of the current I2 by a method similar to the method described in the first exemplary embodiment (i.e., the method of calculating the root mean square value Irms based on the current I detected from a resistor device R3). The detection unit 164 transmits the root mean square value I2rms through the antenna ANT to the control unit 165.

The CPU 151a compares the root mean square value I2rms based on the result of detection of the current I2 with a threshold value I2th and controls the time Th based on the result of comparison.

Figure 9:
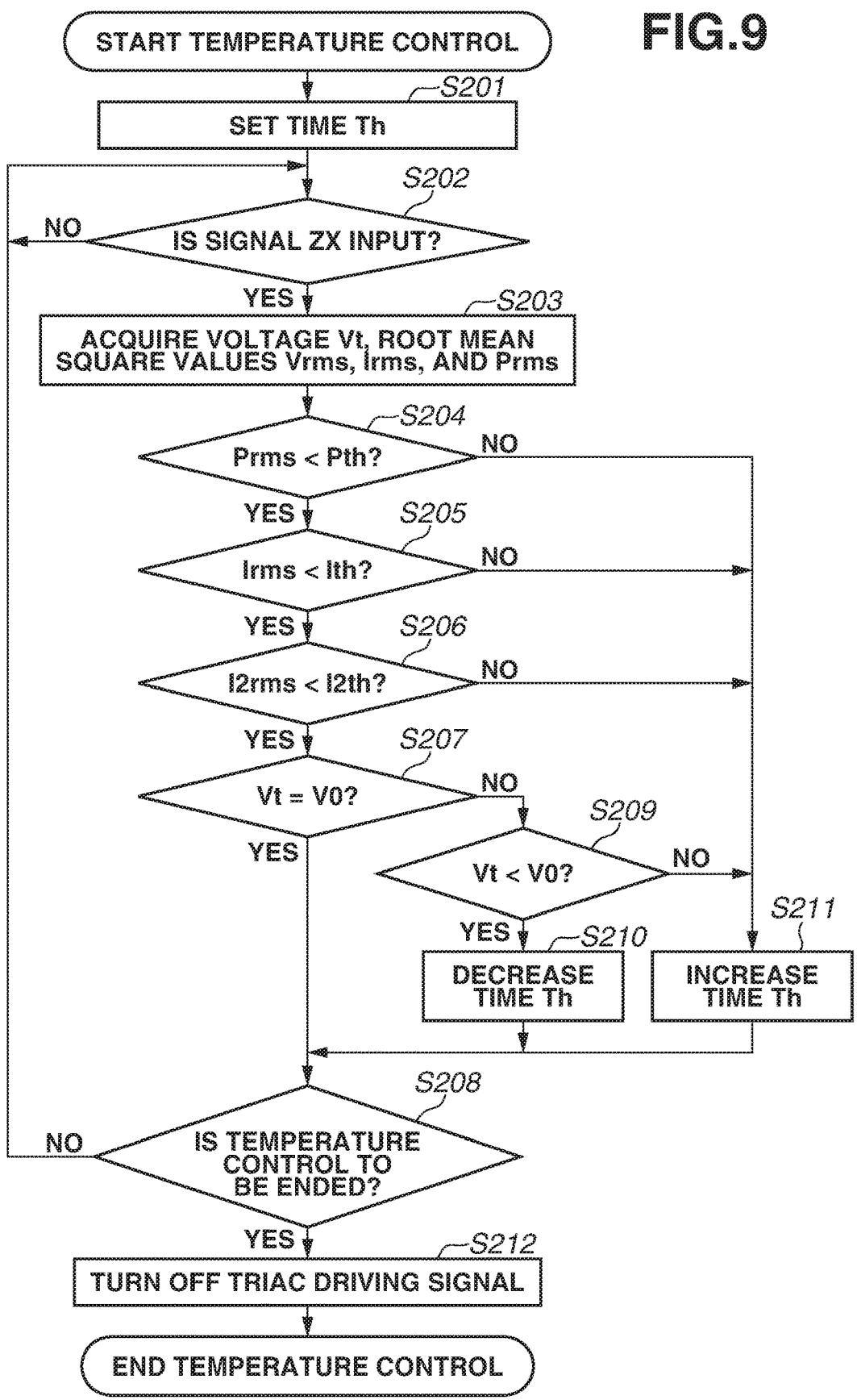
FIG. 9 is a flowchart illustrating a method of controlling the temperature of the fixing heater according to the second exemplary embodiment.

FIG. 9 is a flowchart illustrating the method of controlling the temperature of the fixing heater 161. The temperature control of the fixing heater 161 in the present exemplary embodiment will be described below with reference to FIG. 9. The process illustrated in the flowchart is executed by the CPU 151a. The process illustrated in the flowchart is executed when, for example, the image forming apparatus 100 is activated.

In step S201, the CPU 151a sets the time Th based on, for example, the difference value between the voltage Vt acquired from the A/D conversion device 153 and the voltage V0 corresponding to the target temperature of the fixing heater 161 and notifies the control unit 165 of the set time Th. As a result, the control unit 165 outputs the H-ON signal based on the set time Th to the triac driving circuit 167a.

The processing from step S202 to step S205 is similar to the processing from step S102 to step S105 in FIG. 5, so that description of the processing is omitted.

In step S206, if the root mean square value I2rms is greater than or equal to the threshold value I2th (Prms≥Pth) (NO in step S206), then in step S211, the CPU 151a outputs an instruction to increase the currently-set time Th to the control unit 165. An amount by which the time Th is increased can be a predetermined value or can be determined based on the difference value between the root mean square value I2rms and the threshold value I2th. The threshold value I2th is set to a value that is less than the total amount of power that can be used by the image forming apparatus 100.

The processing from step S207 to step S210 and step S212 is similar to the processing from step S106 to step S111 in FIG. 5, so that description of the processing is omitted.

As described above, the resistor device R4 configured to detect the current I2 having the total amount of current flowing in the first circuit 160a is provided in the first circuit 160a in the AC driver 160 according to the present exemplary embodiment. The time Th is controlled such that the root mean square value I2rms does not exceed the threshold value I2th, and as a result the power supplied to the entire apparatus is prevented from exceeding the power that can be used by the image forming apparatus 100.

The control unit 165 can be configured to have the function of the CPU 151a in the first and second exemplary embodiments, or the CPU 151a can be configured to have the function of the control unit 165.

The voltage V, the current I, the current I2, etc. in the first and second exemplary embodiments correspond to a parameter relating to power supplied to a load.

The triac driving circuit 167a and the triac 167 in the first and second exemplary embodiments are respectively included in an adjustment unit and a triac circuit.

While the CPU 151a acquires the root mean square values in response to the input of the signal ZX in the first and second exemplary embodiments, the configuration is not limited to this example. For example, the CPU 151a can be configured to acquire the root mean square values if the time measured by a timer provided within the CPU 151a reaches the time corresponding to one period of the voltage V. Specifically, the input of the signal ZX from the control unit 165 to the CPU 151a does not have to be employed.

While the triac 167 is used as a component configured to adjust the power supplied to the heating element 161a in the first and second exemplary embodiments, the configuration is not limited to this example. For example, the power supplied to the heating element 161a can be adjusted by changing the circuit resistance in the first circuit 160a to modulate the amplitudes of the voltage and current supplied to the heating element 161a.

While the detection unit 164 transmits the data to the control unit 165 by changing the impedance of the coil L1 to modulate the amplitude of the signal generated in the coil L in the first and second exemplary embodiments, the configuration is not limited to this example. For example, the detection unit 164 can be configured to transmit the data to the control unit 165 by modulating the frequency of the signal generated in the coil L1.

While a near-field communication (NFC) method is used as the method for performing the wireless communication between the detection unit 164 and the control unit 165 in the first and second exemplary embodiments, the method for performing the wireless communication between the detection unit 164 and the control unit 165 is not limited to the above-described method. For example, a method such as an infrared communication method can be used as the method for performing the wireless communication between the detection unit 164 and the control unit 165.

While the first circuit 160a is connected with the commercial power supply in the first and second exemplary embodiments, the configuration is not limited to this example. For example, the first circuit 160a can be configured to be connected with a predetermined power supply such as a battery.

The detection unit 164 and the coil L are included in the first communication unit, and the detection unit 164 is included in a transmission unit. The coil L2 is included in the second communication unit. The resistor R3 is included in a detector.

The disclosure is capable of preventing an increase in apparatus size while an insulated state between first and second circuits is maintained.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2017-230998, filed Nov. 30, 2017, and No. 2018-156696, filed Aug. 23, 2018, which are hereby incorporated by reference herein in their entirety.

What is claimed is:

1. A power supply apparatus including a first circuit connected with a predetermined power supply and a second circuit insulated from the first circuit, the power supply apparatus comprising:
   an adjustment unit in the first circuit configured to adjust power supplied from the predetermined power supply to a load;
   a controller in the second circuit configured to control the adjustment unit;
   a detector in the first circuit configured to detect a parameter relating to the power supplied to the load;
   a first communication unit in the first circuit connected with the detector; and
   a second communication unit in the second circuit, connected with the controller, insulated from the first communication unit, and configured to perform wireless communication with the first communication unit,
   wherein the first communication unit is operated with power supplied to the first communication unit by a signal generated in the first communication unit due to a signal output from the controller to the second communication unit,
   wherein the first communication unit transmits information about a result of detection by the detector to the second communication unit, using the signal generated in the first communication unit due to the signal output from the controller to the second communication unit, and
   wherein the controller controls the adjustment unit based on the information transmitted to the second communication unit.

2. The power supply apparatus according to claim 1, wherein the parameter relating to the power is a current supplied to the load, and
   wherein the controller controls the adjustment unit such that the power supplied to the load is reduced in a case where a root mean square value of the current detected by the detector is greater than a predetermined value.

3. The power supply apparatus according to claim 1, wherein the controller controls the adjustment unit such that the power supplied to the load is reduced in a case where a root mean square value of the power determined based on the result of the detection by the detector is greater than a second predetermined value.

4. The power supply apparatus according to claim 1, wherein the detector detects a voltage as the parameter relating to the power supplied from the predetermined power supply, and wherein the controller controls the adjustment unit based on a root mean square value of the voltage detected by the detector.

5. The power supply apparatus according to claim 1, further comprising:
a light emitting device in the second circuit configured to emit light;
a light receiving device in the first circuit configured to receive the light emitted from the light emitting device; and
a driving unit configured to drive the adjustment unit in response to reception of the light by the light receiving device,
wherein the controller controls the adjustment unit by controlling emission of the light by the light emitting device.

6. The power supply apparatus according to claim 1, wherein the adjustment unit is a triac circuit, and
wherein in a case where the power supplied to the load is to be increased, the controller increases a period during which the triac circuit is in an on-state, whereas in a case where the power supplied to the load is to be decreased, the controller decreases the period during which the triac circuit is in the on-state.

7. The power supply apparatus according to claim 1, wherein the first communication unit includes:
a first antenna including a winding; and
a transmission unit configured to transmit the information by controlling an impedance of the winding of the first antenna,
wherein the second communication unit includes a second antenna including a winding, and
wherein the wireless communication between the first communication unit and the second communication unit is performed by the first antenna and the second antenna.

8. The power supply apparatus according to claim 7, wherein a variable resistor is connected with the winding of the first antenna, and
wherein the first communication unit controls the impedance of the winding of the first antenna by changing a resistance value of the variable resistor.

9. The power supply apparatus according to claim 1, wherein the first communication unit and the second communication unit perform the wireless communication using near-field communication (NFC).

10. The power supply apparatus according to claim 1, wherein the predetermined power supply is a commercial power supply.

11. The power supply apparatus according to claim 1, wherein the detector is a resistor device.

12. An image forming apparatus comprising:
a transfer unit configured to transfer a toner image onto a sheet; and
a fixing unit configured to thermally fix, to the sheet, the toner image transferred onto the sheet by the transfer unit,
the fixing unit including:
a first circuit connected with a predetermined power supply;
a second circuit insulated from the first circuit;
an adjustment unit in the first circuit configured to adjust power supplied from the predetermined power supply to a heater;
a first detector configured to detect a temperature of the heater;
a controller in the second circuit configured to control the adjustment unit such that a deviation of the temperature detected by the first detector from a target temperature of the heater is reduced;
a second detector in the first circuit configured to detect a parameter relating to power supplied to the heater;
a first communication unit in the first circuit connected with the second detector; and
a second communication unit in the second circuit, connected with the controller, insulated from the first communication unit, and configured to perform wireless communication with the first communication unit,
wherein the first communication unit is operated with power supplied to the first communication unit by a signal generated in the first communication unit due to a signal output from the controller to the second communication unit,
wherein the first communication unit transmits information about a result of detection by the second detector to the second communication unit, using the signal generated in the first communication unit due to the signal output from the controller to the second communication unit, and
wherein the controller controls the adjustment unit based on the information transmitted to the second communication unit.

13. The image forming apparatus according to claim 12, further comprising:
a light emitting device in the second circuit configured to emit light;
a light receiving device in the first circuit configured to receive the light emitted from the light emitting device; and
a driving unit configured to drive the adjustment unit in response to reception of the light by the light receiving device,
wherein the controller controls the adjustment unit by controlling emission of the light by the light emitting device.

14. The image forming apparatus according to claim 12, wherein the adjustment unit is a triac circuit, and
wherein in a case where the power supplied to the load is to be increased, the controller increases a period during which the triac circuit is in an on-state, whereas in a case where the power supplied to the load is to be decreased, the controller decreases the period during which the triac circuit is in the on-state.

15. The image forming apparatus according to claim 12, wherein the first communication unit includes:
a first antenna including a winding; and
a transmission unit configured to transmit the information by controlling an impedance of the winding of the first antenna,
wherein the second communication unit includes a second antenna including a winding, and
wherein the wireless communication between the first communication unit and the second communication unit is performed by the first antenna and the second antenna.

16. The image forming apparatus according to claim 15, wherein a variable resistor is connected with the winding of the first antenna, and
wherein the first communication unit controls the impedance of the winding of the first antenna by changing a resistance value of the variable resistor.

17. The image forming apparatus according to claim 12, wherein the first communication unit and the second communication unit perform the wireless communication using NFC.

18. The image forming apparatus according to claim 12, wherein the predetermined power supply is a commercial power supply.

19. The image forming apparatus according to claim 12, wherein the second detector is a resistor device.

* * * * *